Figure 3:
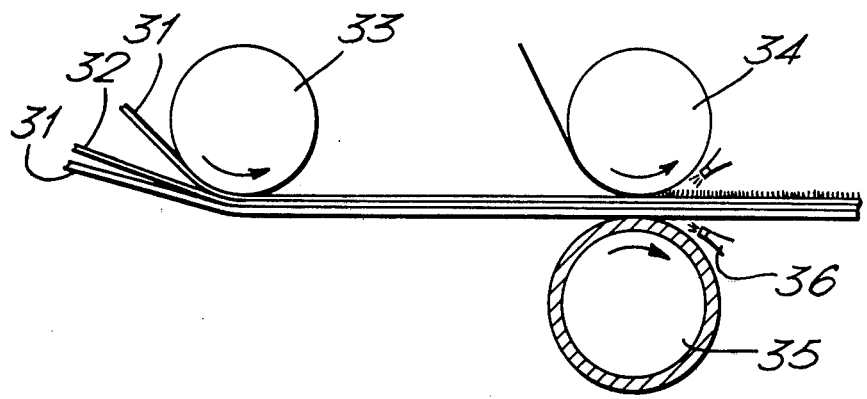

TACK SPUN PILE SURFACED PRODUCTS

United States Patent [19]
Giovanelli et al.

[11] 4,076,874
[45] Feb. 28, 1978

[54] TACK SPUN PILE SURFACED PRODUCTS

[75] Inventors: Anton Alfred Arthur Giovanelli, Oestringen; Eckhard Wolfgang Schmidt, Kirrlach, both of Germany

[73] Assignee: Imperial Chemical Industries Limited, London, England

[21] Appl. No.: 611,242

[22] Filed: Sep. 8, 1975

[30] Foreign Application Priority Data
Sep. 13, 1974  United Kingdom .............. 40001/74

[51] Int. Cl.² ...................... D03D 27/00; D04H 11/00
[52] U.S. Cl. ........................................ 428/35; 156/72;
206/62; 206/313; 428/85; 428/86; 428/95
[58] Field of Search ............... 428/85, 86, 95, 35;
206/62 R, 62 F, 46 R; 156/72

[56] References Cited
U.S. PATENT DOCUMENTS

| 2,962,158 | 11/1960 | Strathers | 206/46 |
| 3,814,791 | 6/1974 | Jones | 428/85 |
| 3,906,128 | 9/1975 | Burling | 428/86 |

Primary Examiner—Marion E. McCamish
Attorney, Agent, or Firm—Cushman, Darby & Cushman

[57] ABSTRACT

A process is provided for the production of pile surfaced products in which the pile is produced by tack spinning thermoplastic polymer composition onto one or both external surfaces, preferably one of a foundation layer which comprises at least two sheets which adhere together using an adhesive having a softening point similar to that of the thermoplastic polymer composition.

14 Claims, 4 Drawing Figures

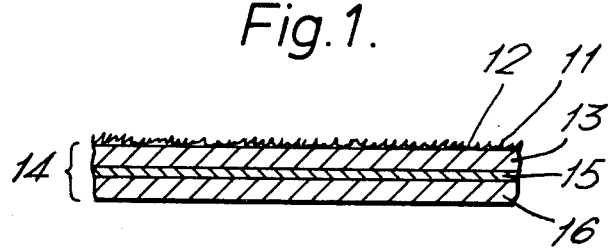
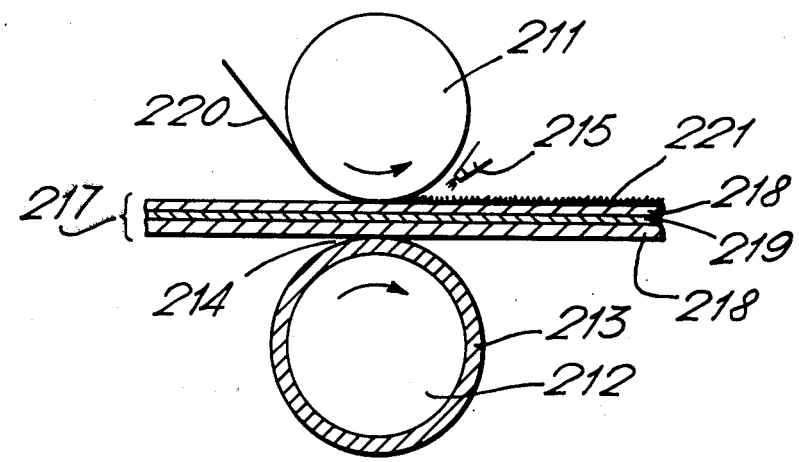

TACK SPUN PILE SURFACED PRODUCTS

This invention relates to pile-surfaced products.

Processes for the production of pile-surfaced products are described in Dutch patent application Nos. 71 16004 and 72 05857 and British patent application No. 1334672 wherein pile-surfaced products are produced by drawing a pile which comprises a plurality of fibres or tufts of fibres of polymeric material. The process in which the pile is formed on a foundation layer is conveniently referred to as "tack-spinning".

The processes described in the specifications in the abovementioned patent applications comprise the steps of interposing a polymeric material between a foundation layer and a temporary anchorage surface (the polymeric material being in a state such that it is tacky and capable of adhering to the foundation layer and also adhering temporarily to the temporary anchorage surface), separating the foundation layer and the temporary anchorage surface so that 'stringing' of the polymeric material occurs with the production of fibres of the polymeric material, hardening the polymeric material by cooling (if it is thermoplastic and had been rendered tacky by heat) of by completion of a cross-linking reaction (where the polymer is a curable polymer and undergoes cure during or after fibre formation), and separation of the fibres from the temporary anchorage surface.

It has been foreseen that "tack-spun" products will be required having physical properties tailored to meet particular end-uses, for example products having certain permeability to water and gases, heat insulation or anti-flame characteristics.

The present invention provides a modification of pile forming processes as described above in which the foundation layer is a laminate which comprises at least two sheets which adhere together using an hot melt adhesive. There may also be an economic advantage in using a laminated foundation layer because a combination of sheets may be used as a foundation layer which is cheaper than and with often similar rigidity to a non-laminated foundation layer.

According to the present invention, a process is provided for the production of pile-surfaced products in which the pile is produced by tack-spinning thermoplastic polymer composition onto one or both external surfaces, preferably one, of a foundation layer which comprises at least two sheets which adhere together using an adhesive having a softening point similar to that of the thermoplastic polymer composition.

Thermoplastic polymer compositions which may be employed in the process of the invention include addition polymers, for example polymers and copolymers of ethylene, propylene, butadiene, vinyl chloride, vinyl acetate, vinylidene chloride, acrylonitrile and styrene and condensation polymers, for example polyamides and polyesters, e.g. of glycols and aromatic dicarboxylic acids. Blends of filament forming polymeric compositions may be used. In particular, specific examples of thermoplastic polymeric compositions that can be employed in the process of the invention are polyethylene, polypropylene, nylon, polyethylene terephthalate and polyvinyl chloride.

The foundation layer is a laminate of any suitable synthetic or natural materials provided that the pile adheres to the relevant surface of the layer. Examples of suitable sheet materials from which the foundation layer may be made include woven or unwoven textile webs from for example hessian, cotton net, glass fibre scrim, linen scrim; paper, metal, cardboard; expanded metal, expanded plastic or extended plastic net; foamed plastic sheeting e.g. of polyurethane.

The foundation layer comprises a laminate of at least two sheets (preferably two) which may be the same or different. The sheets adhere together using an adhesive which softens at least slightly during the formation of the tack-spun pile. If there were no such softening, differences in coefficient of expansion of the sheets and adhesive may result in wrinkling or deformation of the foundation layer. The softening of the adhesive allows for such differences to be compensated. It is preferred that the thermoplastic polymer from which the pile is formed is the same as the adhesive provided of course that the polymer acts as an adhesive for the sheets. The foundation layer may be formed before pile forming step in the tack-spinning process or, in particular when the fibre forming polymer is the same as the adhesive, the laminar foundation layer may be formed simultaneously with the fibrous pile. For this embodiment the sheets together with inter-sheet adhesive in the form of, for example, granules, powder, solution, dispersion or preferably film are heated together effectively at the same time as thermoplastic polymer is fed between the heated temporary surface and the surface of the foundation layer. The sheets and adhesive may if desired, be brought together, optionally with the fibre-forming thermoplastic composition, before the heating stage.

Figure 4:
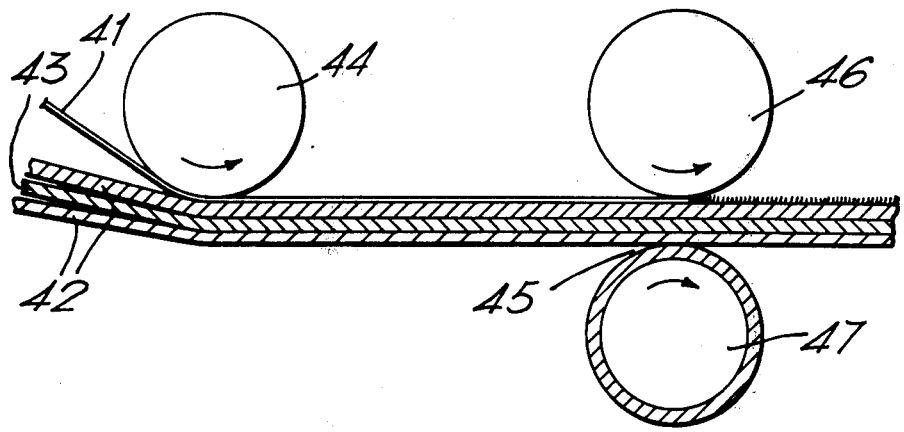

The invention is illustrated with reference to the accompanying drawings in which:

FIG. 1 is a cross section of a pile-surfaced product made by the process of the present invention, FIG. 2 is a diagram of an apparatus in which the foundation layer is preformed, FIG. 3 is a diagram of an apparatus in which the sheets of the foundation layer are brought together before the tack-spun pile is formed, and FIG. 4 is a diagram of an apparatus in which the sheets of the foundation layer, adhesive and the fibre-forming thermoplastic composition are brought together before heating.

In FIG. 1, a pile-surface product has pile surface 11 attached to the outer surface 12 of one sheet 13 of the foundation layer 14. Adhesive 15 joins sheet 13 to sheet 16 to form foundation layer 14.

In FIG. 2, a heated roller 211 is provided with a backing roller 212 which has a resilient layer 213 to form a nip 214. The resilient layer is preferably heat-resistant because it may be required to provide heating means for roller 212. The resilient layer may also be coated with a non-stick material, e.g. "Fluon" (Trade Mark) or a silicone. Cooling means 215 are provided to cool and set the pile fibres as they break away from the roller 211.

A preformed foundation layer 217 comprises sheets 218 and adhesive layer 219. Fibre-forming thermoplastic composition in the form of a film 220 meets the foundation layer in the nip 214. Pile 221 is formed as laminate leaves the nip and is set by cooling means 215.

The apparatus illustrated in FIG. 3 is similar to that in FIG. 2 except that the components of the laminate, sheets 31 and adhesive films 32 are brought together by roller 33 before lamination and pile formation using heated roller 34 and backing roller 35. It is preferred that roller 35 is heatable so as to facilitate better lamination and hence additional cooling means 36 are provided which primarily cool the foundation layer.

The apparatus illustrated in FIG. 4 is similar to that illustrated in FIG. 3 except that film 41 from which the pile is formed and the sheets 42 and adhesive 43 film are brought together at roller 44 and subsequently fed to nip 45 formed between heated roller 46 and roller 47.

Pile surface products were made using the apparatus illustrated in FIG. 3 at a speed of 100 cm per minute. The thermoplastic composition from which the pile was formed was unfilled low density polyethylene and the adhesive used was low density unfilled polyethylene film. The temperature of roller 34 was 160° C. A number of products were made in which (referring to FIG. 1) sheets 13 and 16 were paper and had weights 70, 90 and 120 gm$^{-2}$ and in which adhesive layer 15 had weights 30 and 40 gm$^{-2}$.

The product having high quality (120 gm$^{-2}$) sheet 16 was fabricated into a phonographic record "sleeve"; sheet 16 could be preprinted on its outside face and in the record sleeve, the pile surface of the laminate from the interior surface of the sleeve, so reducing entry of dust into the sleeve and providing protection for the record.

What we claim is:

1. A process for the production of pile surfaced products in which the pile is produced by tack-spinning thermoplastic polymer composition onto one or both external surfaces, of a foundation layer which comprises at least two sheets which adhere together using an adhesive having a softening point similar to that of the thermoplastic polymer composition.

2. A process according to claim 1 in which the pile is produced on one external surface of the foundation layer.

3. A process according to claim 1 in which sheets which form the foundation layer are caused to adhere together at the same time as the pile surface is produced.

4. A process according to claim 1 in which the adhesive is the same polymeric material as that from which the pile surface is produced.

5. A process according to claim 1 in which the foundation layer comprises two sheets.

6. A process according to claim 1 in which the adhesive is applied in the form of a film.

7. A process according to claim 1 in which the thermoplastic from which the pile is formed is low density polyethylene.

8. A process according to claim 1 in which the adhesive is a polymer of ethylene.

9. A pile surfaced product having a laminated foundation layer whenever produced by a process as claimed in claim 1.

10. A pile surfaced product according to claim 9 in the form of a phonographic record sleeve.

11. A process according to claim 1, wherein said sheet is formed of a material which is woven or unwoven textile web, including hessian, cotton net, glass fibre scrim, linen scrim; paper, metal, cardboard; expanded metal, expanded plastic, extended plastic net; or foamed plastic sheeting, wherein each of said two sheets may be formed of the same or different material.

12. A process according to claim 11, wherein said thermoplastic material is selected from the group consisting of polymers of ethylene, copolymers of ethylene, propylene, butadiene, vinyl chloride, vinyl acetate, vinylidene chloride, acrylonitrile, styrene, polyamides or polyesters.

13. A process according to claim 11, wherein said thermoplastic composition is polyethylene, polypropylene, nylon, polyethylene terephthalate or polyvinyl chloride.

14. A process according to claim 13, wherein the adhesive is the same polymeric material as that from which the pile surface is produced.

* * * * *